June 7, 1938.  K. E. CROOKS  2,119,804
COMPOSITE FLOOR
Filed March 18, 1936
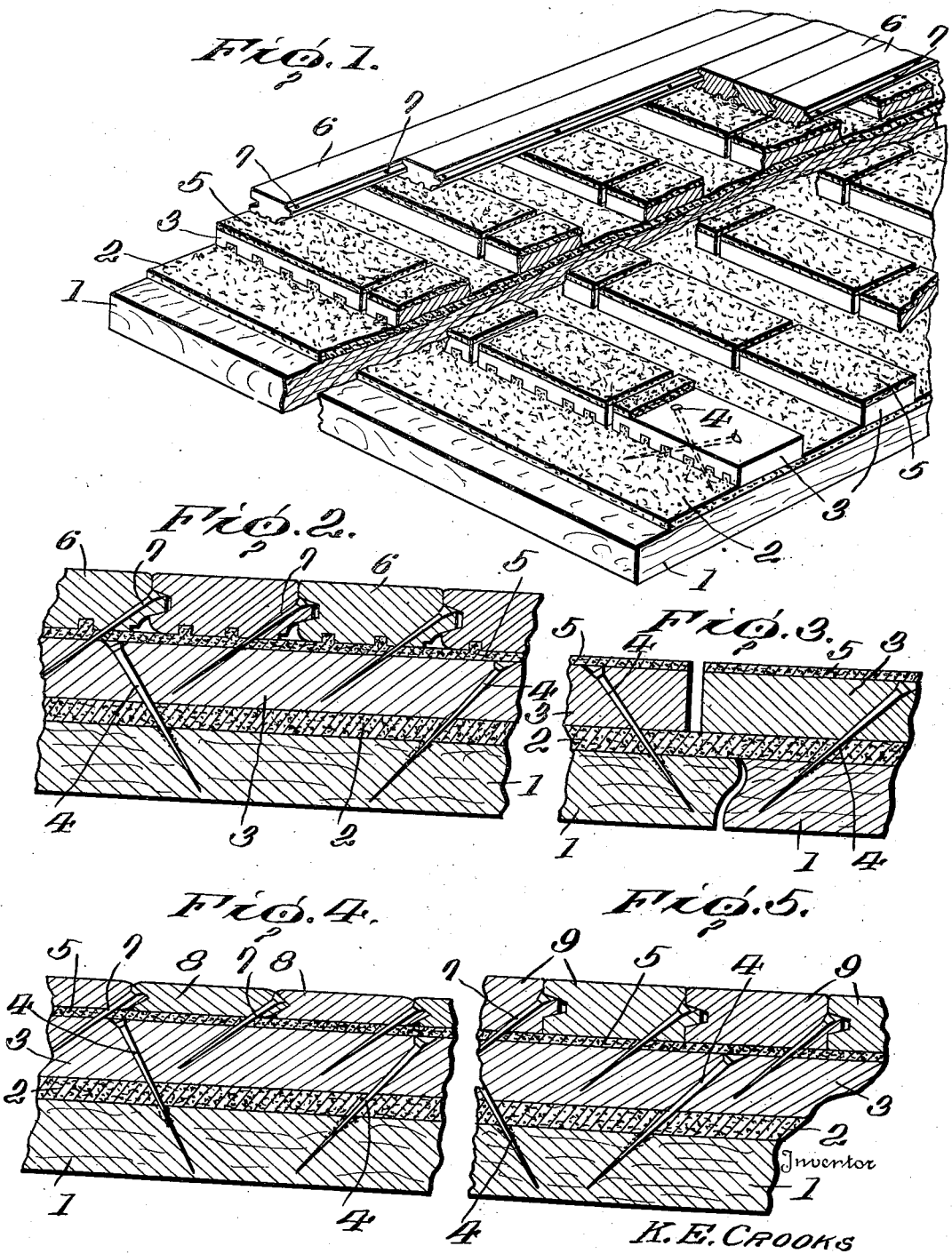

Patented June 7, 1938

2,119,804

UNITED STATES PATENT OFFICE 2,119,804

COMPOSITE FLOOR

Kenneth E. Crooks, Williamsport, Pa.

Application March 18, 1936, Serial No. 69,554

5 Claims. (Cl. 20—7)

This invention relates to a composite floor, the object being to provide a floor formed of a gypsum subfloor over which is arranged a layer of non-drying mastic upon which is disposed nailing strips secured to the gypsum subfloor by nails extending at an angle and upon which is laid strip flooring whereby the edge bends of the crooked strips of flooring can be straightened out and a flooring secured firmly to the nailing strips so as to form a composite flooring which overcomes the difficulties existing with flooring of this character now in use.

Another object of my invention is to provide a flooring which is insect-proof and one which is especially constructed to prevent the penetration of termites and the like, the non-drying mastic forming a trap so as to entangle the termites and by incorporating within the mastic a toxic deadly to insect life, a very efficient insect-proof flooring is provided.

A still further object of the invention is to provide a composite floor in which mastic is used so as to not only aid in holding the nailing strip to the gypsum subfloor but also aid in holding the strip flooring firmly in its set position on the nailing strips.

Other and further objects and advantages of the invention will be hereinafter set forth and the novel features thereof defined by the appended claims.

In the drawing,

Figure 1 is a perspective view of a composite flooring constructed in accordance with my invention;

Figure 2 is a detail enlarged section;

Figure 3 is a detail section showing the position of the nails when arranged obliquely for holding the nailing strips to the gypsum blocks;

Figure 4 is a detail enlarged section showing a modified form of flooring strip; and Figure 5 is a similar view showing still another modified form of flooring strip.

In constructing a composite flooring in accordance with my invention a subfloor is formed of a plurality of gypsum blocks 1, the edges of which are interlocked and over which is spread a layer of non-drying mastic 2 which fills the cracks between the blocks and forms a trap for termites and the like as any insect boring through the gypsum block becomes entangled in the non-setting mastic and in carrying out my invention I preferably incorporate in the non-drying mastic a toxic deadly to insects so that after the termite becomes entangled, it will be exterminated.

On top of the layer 2 of non-setting plastic mastic I arrange nailing strips 3, preferably formed of wood, which may or may not be treated to relieve stresses and strains as for example by forming transverse kerfs in the under surface of the same. These strips are preferably arranged in alignment with one another and are spaced apart at their ends.

The strips are secured to the gypsum blocks by driving nails 4 through the strips into the gypsum blocks obliquely and as the nails pass through the layer of non-setting plastic mastic, they receive a coating of the mastic which is carried into the gypsum block to aid the holding of the nail therein.

On the upper surface of the nailing strips 3 I arrange a layer of mastic 5 and on these nailing strips I preferably lay strips of self-leveling flooring 6 constructed in accordance with my Patent No. 2,008,244, dated July 16, 1935, which are secured in the usual manner by nails 7 and as the nailing strips are preferably formed of wood having the necessary nail holding power, the crooked strips of flooring which have edge bends can be drawn properly into interlocking engagement with one another so as to provide a smooth surface thereby enabling crooked and straight strips of flooring to be used in forming the composite flooring.

In the modification shown in Figure 4, I show a composite flooring constructed substantially as shown in Figures 1, 2, and 3, with the exception that the flooring strips 8 are provided with substantially V-shaped tongues and grooves to provide a self-leveling floor.

In the modification shown in Figure 5, a similar construction is shown with a modified form of flooring strip 9.

In all of the embodiments of my invention as herein shown, my composite floor consists of a gypsum subfloor, a layer of non-drying plastic mastic to which is secured nailing strips by obliquely arranged nails and a layer of mastic to receive the flooring strips which are secured by nailing the same to the nailing strips.

It is a well known fact in the art that a gypsum composition does not have the required nail drawing and holding power to enable strip flooring to be properly laid thereon and I have found that by constructing a floor as herein shown and described, by the use of nailing strips which are secured to the gypsum subfloor by nails extending at an angle through the strips into the subfloor, I am able to form a composite flooring out of flooring strips of various lengths whether straight or crooked.

From the foregoing description it will be seen that I have provided a composite flooring which is insect-proof and which can be laid cheaply as by employing nailing strips and securing the same in position on the gypsum subfloor by nails extending obliquely therethrough, these strips will be firmly locked or keyed in position on the gypsum subfloor so that a strip flooring can be nailed to the nailing strips.

In the specification I have used the word "gypsum" to cover any gypsum composition or the like and while I have shown a subfloor formed of gypsum blocks, I wish it to be clearly understood that my invention can be used with gypsum composition or the like which is either in block form or is spread upon a subfloor and therefore I wish it to be understood that I do not wish to limit myself to any particular composition as my invention is adapted for use with any kind of composition subfloor which does not have the required nail drawing and holding power to secure the flooring thereto.

One of the essential features of my invention is the toxic poison incorporated within the adhesive such as mastic so as to exterminate insects of all kinds and small animals, such as mice and rats, as it is well known in the art that vermin such as termites will penetrate through mortar, gypsum and weak mixtures of Portland cement in order to reach the wood and by combining toxic poisons with the mastic, the quality of the mastic is not depreciated and a flooring is formed which is substantially insect and animal proof.

What I claim is:

1. A composite flooring comprising a subfloor formed of a plurality of gypsum blocks, a layer of non-drying plastic mastic arranged on the upper surface of said blocks and between the cracks between said blocks, nailing strips arranged on the coating of non-drying plastic mastic and secured to said blocks by nails passing therethrough at an angle into said blocks and strip flooring arranged on said nailing strips and secured to said strips by nails.

2. A composite flooring comprising a subfloor formed of a plurality of gypsum blocks, a layer of non-drying plastic mastic arranged on the upper surface of said blocks between the cracks between said blocks, nailing strips arranged on the coating of non-drying plastic mastic and secured to said blocks by nails passing therethrough at an angle into said blocks, a layer of mastic arranged on the upper surface of said nailing strips and strip flooring arranged on said nailing strips and secured to said strips by nails.

3. A composite flooring formed of a gypsum subfloor having a layer of non-drying plastic mastic disposed on the upper surface thereof containing a toxic deadly to insects, nailing strips disposed on the layer of plastic mastic out of contact with one another, nails extending obliquely through said nailing strips into said gypsum subfloor for securing said nailing strips in position thereon, a coating of mastic disposed on the upper surface of said nailing strips and a self-leveling flooring composed of a mixture of straight and crooked strips disposed on the coating of mastic on said nailing strips and secured to said nailing strips by nails.

4. A composite flooring formed of a subfloor lacking nail drawing and holding power having a layer of non-drying plastic adhesive composition disposed on the upper surface thereof containing a toxic poison, nailing strips disposed on the layer of adhesive composition, nails extending obliquely through said nailing strips and into the subfloor, a coating of adhesive material disposed upon the upper surface of the nailing strips and tongue and groove flooring composed of a mixture of straight and crooked strips disposed on the layer of mastic on the nailing strips and secured to said nailing strips by nails.

5. A composite floor formed of a sub-floor lacking nail-holding and drawing power and a layer of plastic alhesive material arranged on the upper surface of said sub-floor, and nailing strips arranged on the coating of plastic alhesive material and secured thereto by nails.

KENNETH E. CROOKS.